US012744338B2

(12) United States Patent
Lin et al.

(10) Patent No.: US 12,744,338 B2
(45) Date of Patent: Sep. 22, 2026

(54) PRESS FIT TERMINAL

(71) Applicant: Cheng Uei Precision Industry Co., Ltd., New Taipei City (TW)

(72) Inventors: Chuan Hung Lin, New Taipei City (TW); Sheng Nan Yu, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 393 days.

(21) Appl. No.: 18/602,136

(22) Filed: Mar. 12, 2024

(65) Prior Publication Data

US 2025/0015518 A1 Jan. 9, 2025

(30) Foreign Application Priority Data

Jul. 4, 2023 (CN) ......................... 202321738962.8

(51) Int. Cl.
*H01R 12/58* (2011.01)

(52) U.S. Cl.
CPC .................................. *H01R 12/585* (2013.01)

(58) Field of Classification Search
CPC .............................. H01R 12/58; H01R 12/585
See application file for complete search history.

(56) References Cited

U.S. PATENT DOCUMENTS 4,954,103 A * 9/1990 Liebich .................. H01R 12/58 439/82
6,098,281 A * 8/2000 Rudi .................... H01R 12/585 29/841
6,722,928 B1 * 4/2004 Noda ................... H01R 12/585 439/82
10,693,248 B2 * 6/2020 Teichmann ............ H05K 1/144
2005/0106906 A1 * 5/2005 Ocket .................. H01R 12/585 439/81

FOREIGN PATENT DOCUMENTS

CN 209675515 U 11/2019

* cited by examiner

*Primary Examiner* — Oscar C Jimenez

(57) ABSTRACT

A press fit terminal includes an assembling portion, an insertion portion and a fastening portion. The assembling portion has two side walls and a connecting portion. The two side walls are disposed to two opposite sides of the assembling portion, respectively. The connecting portion is disposed in a middle of the assembling portion. The connecting portion is connected between the two side walls. Each side wall has an outer surface and an inner surface. The two outer surfaces of the two side walls are shown as two arc shapes. The two inner surfaces of the two side walls are shown as two curve surfaces. The insertion portion is connected with two ends of the two side walls of the assembling portion. The fastening portion is connected with the other two ends of the two side walls of the assembling portion.

19 Claims, 10 Drawing Sheets

PRESS FIT TERMINAL

CROSS-REFERENCE TO RELATED APPLICATION

The present application is based on, and claims priority from, China Patent Application No. 202321738962.8, filed Jul. 4, 2023, the disclosure of which is hereby incorporated by reference herein in its entirety.

BACKGROUND OF THE INVENTION

1. Field of the Invention

The present invention generally relates to a press fit terminal, and more particularly to a press fit terminal which is capable of increasing a contact area and reducing an insertion force.

2. Description of the Prior Art

A common press fit terminal is generally a type of stamping terminals. When two elastic portions of the common press fit terminal are squeezed, the two elastic portions of the common press fit terminal are elastically contracted. The press fit terminal is successfully inserted into a through hole of a circuit board so as to realize that the press fit terminal is electrically connected with the circuit board. The common press fit terminal has following characteristics. The common press fit terminal is conveniently assembled with the circuit board. The common press fit terminal is needless of a soldering requirement. The common press fit terminal has a detachable and changeable performance. The common press fit terminal is able to be matched with a smaller conductive insertion hole of the circuit board. Thus the common press fit terminal is widely used.

A conventional press fit terminal includes an elastic portion, an insertion end and a wiring end extended from two opposite ends of the elastic portion, respectively. The elastic portion has two contact arms which are shown as arc shapes. An outer surface of each contact arm has a contact portion. An outside structure of the contact portion has a middle portion, and two outer arc surfaces located at two sides of the middle portion. The middle portion is disposed between the two outer arc surfaces. The two outer arc surfaces are attached to an inner arc surface of a soldering hole of a circuit board.

However, the two outer arc surfaces are attached to the inner arc surface of the soldering hole of the circuit board of the conventional press fit terminal. A connection between the middle portion and the soldering hole causes a point contact, so a contact area of the conventional press fit terminal is sufficient, a connecting stability between the press fit terminal and the circuit board is affected.

Thus, it is essential to provide an innovative press fit terminal which is capable of increasing a contact area and reducing an insertion force.

SUMMARY OF THE INVENTION

An object of the present invention is to provide a press fit terminal inserted into a through hole of a circuit board. The press fit terminal includes an assembling portion, an insertion portion and a fastening portion. The assembling portion is corresponding to the through hole of the circuit board. The assembling portion has two side walls and a connecting portion. The two side walls are disposed to two opposite sides of the assembling portion, respectively. The connecting portion is disposed in a middle of the assembling portion. The connecting portion is connected between the two side walls. Each side wall has an outer surface and an inner surface. The two outer surfaces of the two side walls are shown as two arc shapes. The two inner surfaces of the two side walls are shown as two curve surfaces. The two outer surfaces of the two side walls are tightly attached to an interior surface of an inner wall of the through hole. The inner surface of each side wall has two first curve surfaces and two second curve surfaces. An upper portion of an upper end and a lower portion of a lower end of the inner surface of each side wall are curved outward to form two first curve surfaces, respectively. Two inner ends of the two first curve surfaces are gradually curved inward and towards each other to form two second curve surfaces. The connecting portion has two bending portions. The two second curve surfaces of each side wall are connected with an outer end of one bending portion of the connecting portion. The insertion portion is connected with two ends of the two side walls of the assembling portion. The fastening portion is connected with the other two ends of the two side walls of the assembling portion.

Another object of the present invention is to provide a press fit terminal inserted into a through hole of a circuit board. The press fit terminal includes an assembling portion, an insertion portion and a fastening portion. The assembling portion is corresponding to the through hole. The assembling portion has two side walls and a connecting portion. The two side walls are disposed to two opposite sides of the assembling portion, respectively. Each side wall has an outer surface and an inner surface. The two outer surfaces of the two side walls are shown as two arc shapes. The two inner surfaces of the two side walls are shown as two curve surfaces. The connecting portion is disposed in a middle of the assembling portion. The connecting portion is connected between the two side walls. The connecting portion has two bending portions. A junction between two inner sides of the two bending portions is recessed downward to form an indentation. A thickness of the junction between the two inner sides of the two bending portions is smaller than thicknesses of two outer sides of the two bending portions by the indentation. The insertion portion is connected with two ends of the two side walls of the assembling portion. The fastening portion is connected with the other two ends of the two side walls of the assembling portion.

Another object of the present invention is to provide a press fit terminal inserted into a through hole of a circuit board. The press fit terminal includes an assembling portion, an insertion portion and a fastening portion. The assembling portion is corresponding to the through hole. The assembling portion has two side walls and a connecting portion. The two side walls are disposed to two opposite sides of the assembling portion, respectively. Each side wall has an outer surface and an inner surface. The two outer surfaces of the two side walls are shown as two arc shapes. The two inner surfaces of the two side walls are shown as two curve surfaces. The inner surface of each side wall has two first curve surfaces and two second curve surfaces. An upper portion of an upper end and a lower portion of a lower end of the inner surface of each side wall are curved outward to form two first curve surfaces, respectively. Two inner ends of the two first curve surfaces are gradually curved inward and towards each other to form two second curve surfaces. The connecting portion is disposed in a middle of the assembling portion. The connecting portion is connected between the two side walls. The connecting portion has two bending portions. A junction between two inner sides of the two bending portions is recessed downward to form an indentation. A thickness of the junction between the two inner sides of the two bending portions is smaller than thicknesses of two outer sides of the two bending portions by the indentation. The insertion portion is connected with two ends of the two side walls of the assembling portion. The fastening portion is connected with the other two ends of the two side walls of the assembling portion.

As described above, the two outer surfaces of the two side walls of the assembling portion are shown as the two arc shapes, and the two inner surfaces of the two side walls of the assembling portion are shown as the two curve surfaces, the two side walls are squeezed and deformed by a cooperation of a size of the through hole. A middle of an upper surface of the connecting portion is recessed downward to form the indentation, so that thicknesses of the two inner sides of the two bending portions are smaller than the thicknesses of the two outer sides of the two bending portions by the indentation, and the indentation reduces an insertion force of the press fit terminal when the press fit terminal is inserted into the through hole. Thus, the press fit terminal is capable of increasing a contact area and reducing the insertion force.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
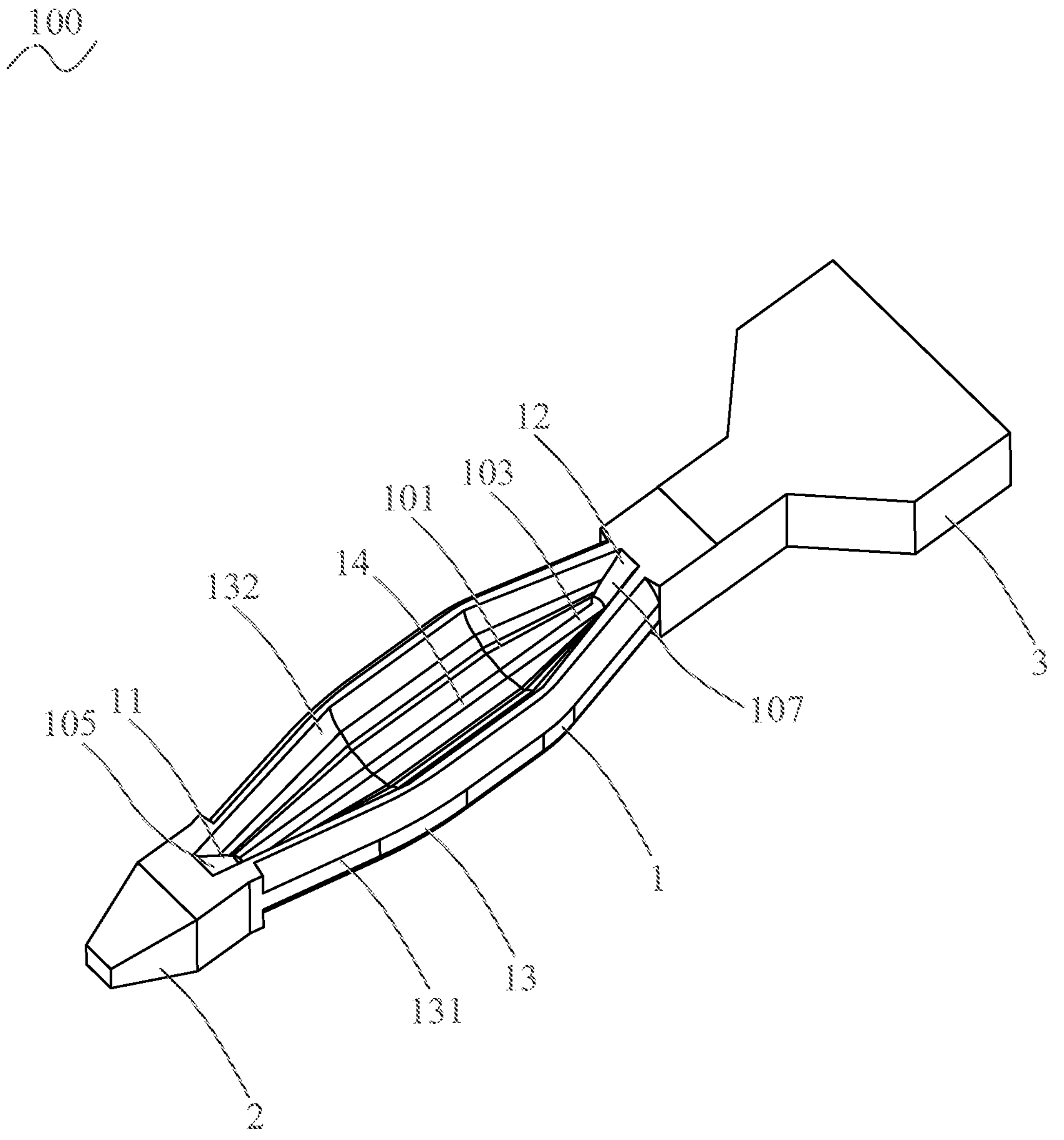
FIG. 1 is a perspective view of a press fit terminal in accordance with a first preferred embodiment of the present invention.
Figure 2:
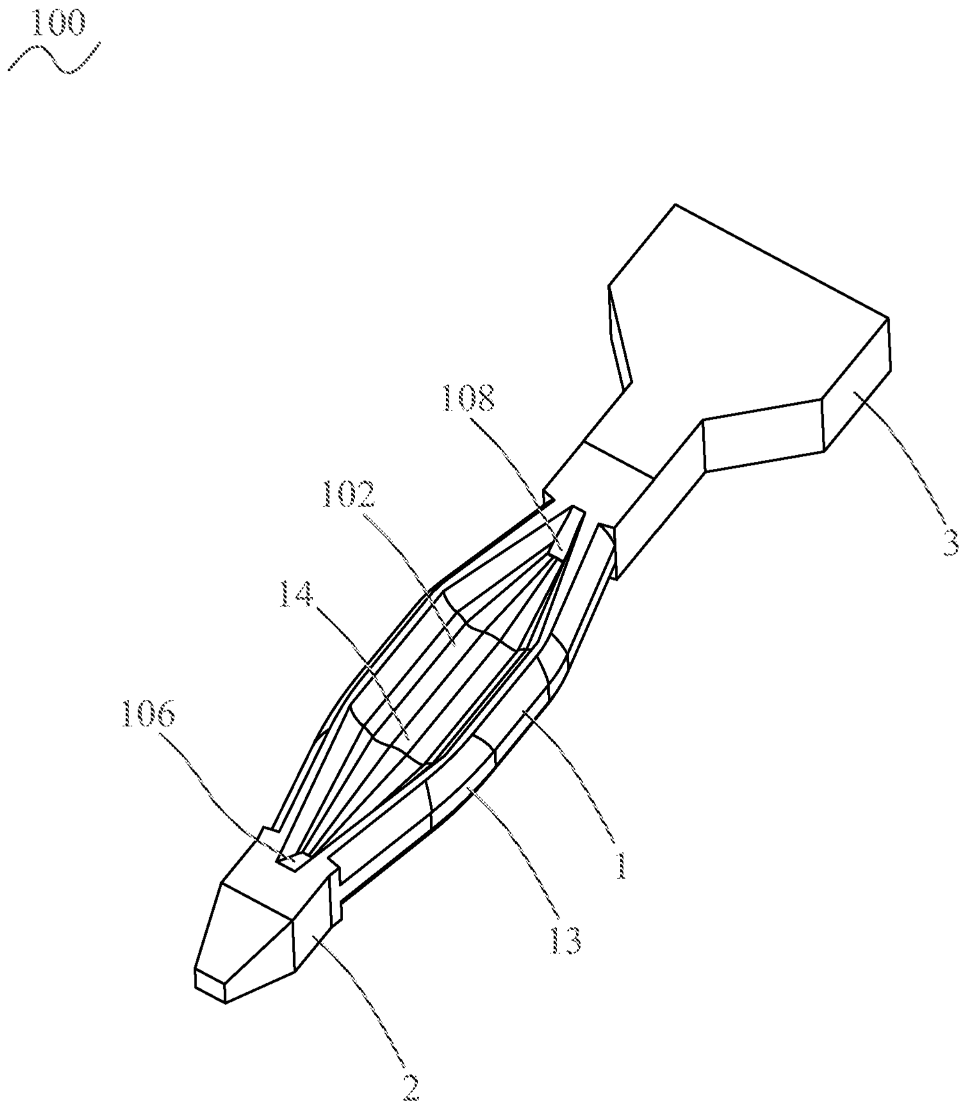
FIG. 2 is another perspective view of the press fit terminal in accordance with the first preferred embodiment of the present invention.
Figure 3:
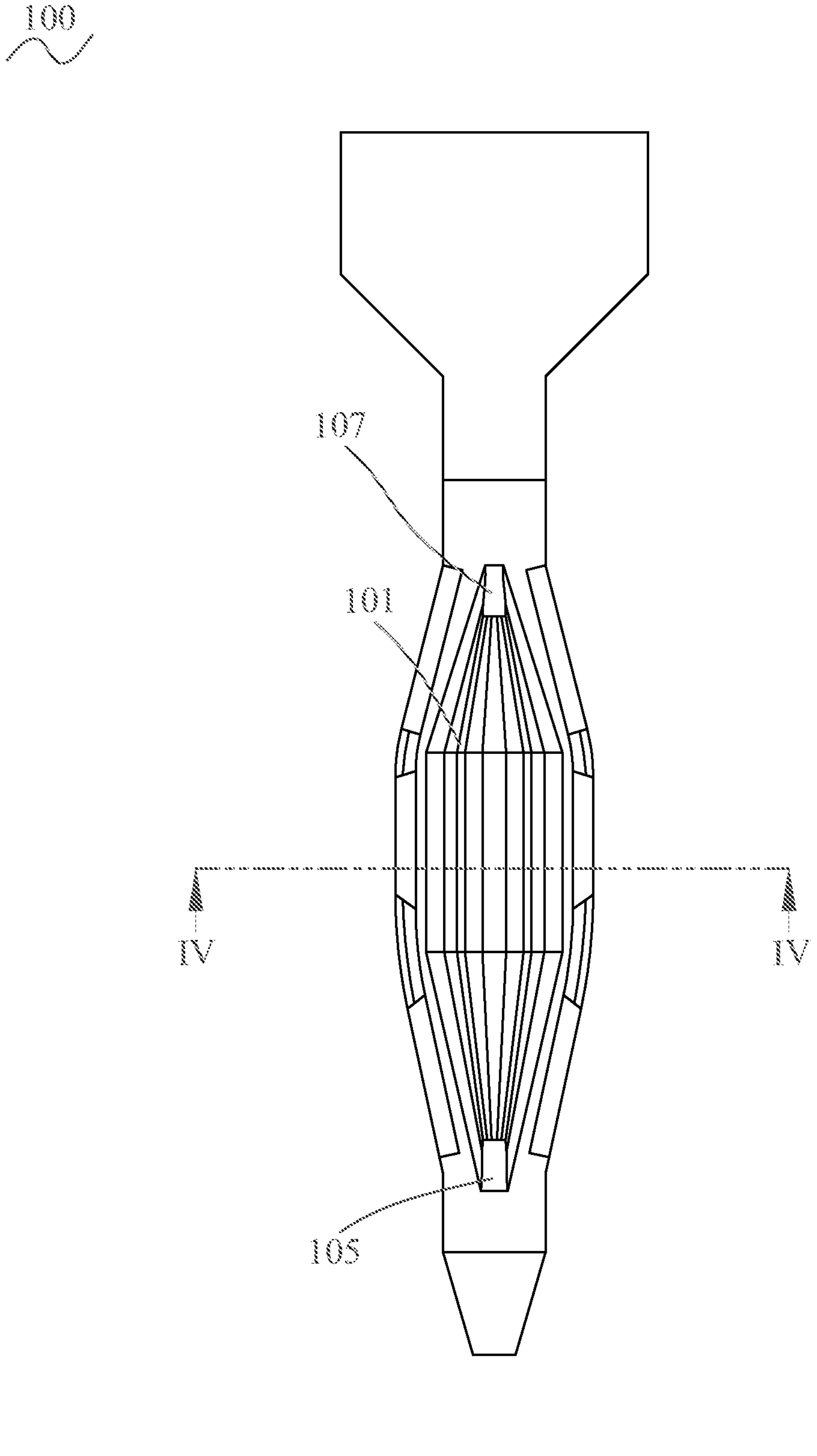
FIG. 3 is a diagrammatic drawing of the press fit terminal in accordance with the first preferred embodiment of the present invention.
Figure 4:
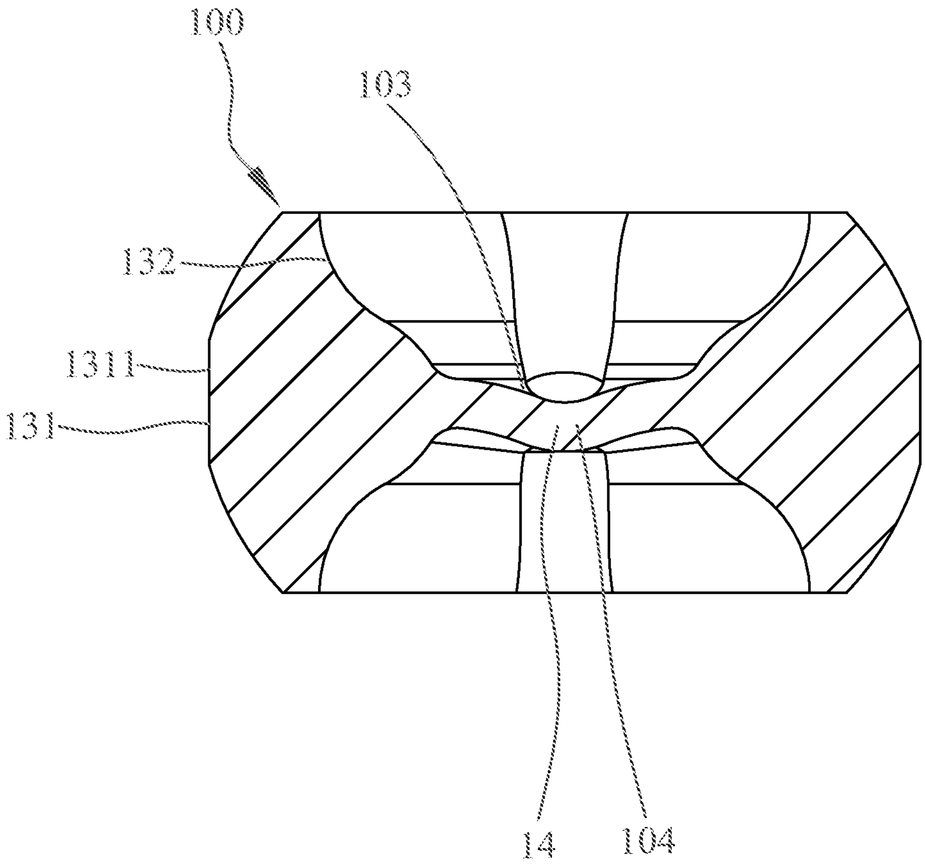
FIG. 4 is a sectional diagram of the press fit terminal along a line III-III of FIG. 3.
Figure 5:
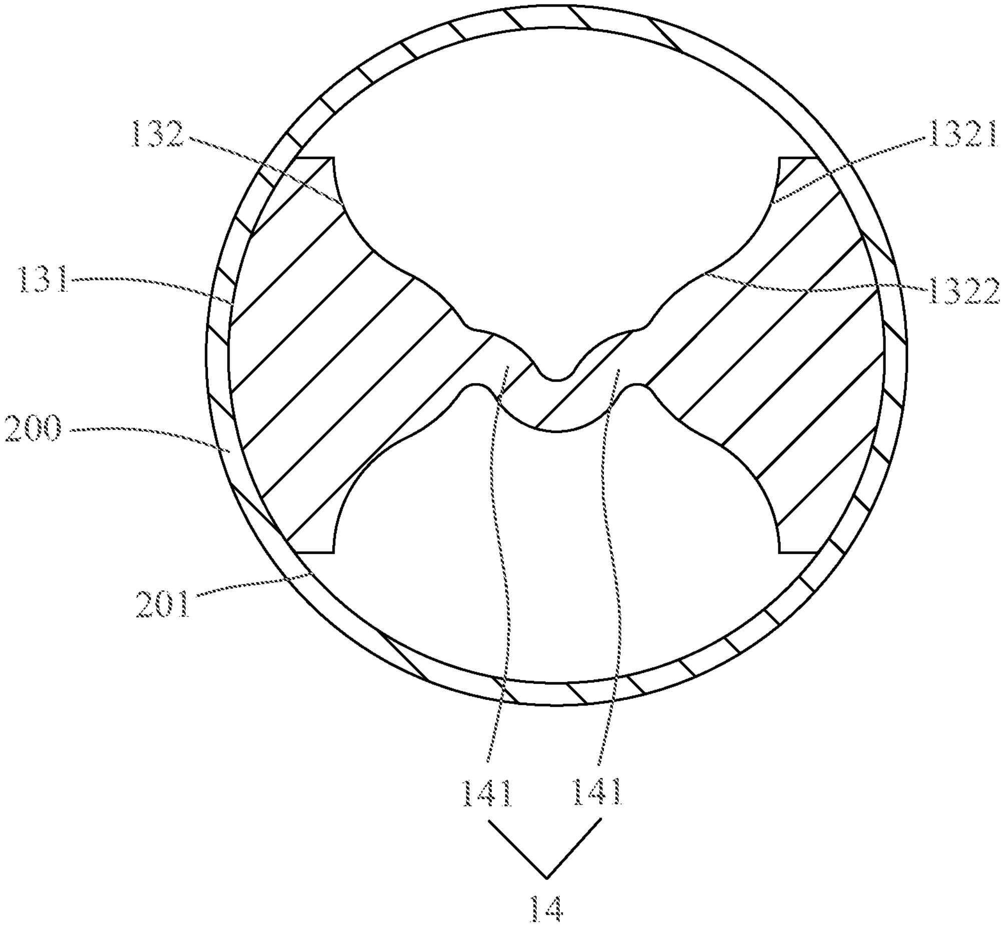
FIG. 5 is a partially sectional diagram of the press fit terminal, wherein when the press fit terminal is inserted into a through hole of a circuit board, the press fit terminal is cooperated with the through hole of the circuit board in transition.

With reference to FIG. 1 to FIG. 5, a press fit terminal 100 in accordance with a first preferred embodiment of the present invention is shown. The press fit terminal 100 is inserted into a through hole 200 of a circuit board (not shown) to realize that the press fit terminal 100 is electrically connected with the circuit board (not shown). The press fit terminal 100 includes an assembling portion 1, an insertion portion 2 and a fastening portion 3.

A front end of the assembling portion 1 extends frontward to from the insertion portion 2. A rear end of the assembling portion 1 extends rearward to from the fastening portion 3. The assembling portion 1 is formed between the insertion portion 2 and the fastening portion 3. Two opposite sides of the fastening portion 3 transversely expand oppositely. The assembling portion 1 is corresponding to the through hole 200 of the circuit board (not shown).

The assembling portion 1 has a front surface 11, a rear surface 12, two side walls 13 and a connecting portion 14. The front surface 11 is disposed at a front end of the assembling portion 1. The rear surface 12 is disposed at a rear end of the assembling portion 1. The front surface 11 and the rear surface 12 are disposed oppositely. The front surface 11 and the rear surface 12 are disposed between the front end of the assembling portion 1 and the rear end of the assembling portion 1. The front end of the assembling portion 1 where the front surface 11 is disposed is connected with a rear end of the insertion portion 2. The rear end of the assembling portion 1 where the rear surface 12 is disposed is connected with a front end of the fastening portion 3. The two side walls 13 are disposed to two opposite sides of the assembling portion 1, respectively. The connecting portion 14 is disposed in a middle of the assembling portion 1. The connecting portion 14 is connected between the two side walls 13 of the assembling portion 1. The insertion portion 2 is connected with two ends of the two side walls 13 of the assembling portion 1. The fastening portion 3 is connected with the other two ends of the two side walls 13 of the assembling portion 1. Specifically, the insertion portion 2 is connected with two front ends of the two side walls 13 of the assembling portion 1. The fastening portion 3 is connected with two rear ends of the two side walls 13 of the assembling portion 1.

A middle of a top of the assembling portion 1 is recessed inward to form an upper assembling groove 101. A middle of a bottom of the assembling portion 1 is recessed inward to form a lower assembling groove 102. The connecting portion 14 is formed between the upper assembling groove 101 and the lower assembling groove 102. The upper assembling groove 101 is isolated from the lower assembling groove 102 by the connecting portion 14.

The front surface 11 includes an upper front surface 105 and a lower front surface 106. The rear surface 12 includes an upper rear surface 107 and a lower rear surface 108. The upper front surface 105 is connected with a front end of an upper surface of the connecting portion 14 and two fronts of two upper portions of the two side walls 13 of the assembling portion 1. The upper rear surface 107 is connected with a rear end of the upper surface of the connecting portion 14 and two rears of the two upper portions of the two side walls 13 of the assembling portion 1. The lower front surface 106 is connected with a front end of a lower surface of the connecting portion 14 and two fronts of two lower portions of the two side walls 13 of the assembling portion 1. The lower rear surface 108 is connected with a rear end of the lower surface of the connecting portion 14 and two rears of the two lower portions of the two side walls 13 of the assembling portion 1.

Each side wall 13 has an outer surface 131 and an inner surface 132. In the first preferred embodiment, two middles of the two side walls 13 of the assembling portion 1 are oppositely arched outward to form two middle sections 1311. The two outer surfaces 131 of the two side walls 13 of the assembling portion 1 are shown as two arc shapes. The two inner surfaces 132 of the two side walls 13 of the assembling portion 1 are shown as two curve surfaces. An upper portion of an upper end and a lower portion of a lower end of the inner surface 132 of each side wall 13 of the assembling portion 1 are curved outward, and then are gradually curved inward and towards each other to form one curve surface. The two outer surfaces 131 of the two side walls 13 of the assembling portion 1 are used for increasing a contact area of the through hole 200 of the circuit board (not shown) to improve a connection stability. The connecting portion 14 is connected between two innermost portions of the two inner surfaces 132 of the two side walls 13 of the assembling portion 1.

In the first preferred embodiment, the two innermost portions of the two inner surfaces 132 of the two side walls 13 of the assembling portion 1 are two middles of the two inner surfaces 132 of the two side walls 13 of the assembling portion 1. The connecting portion 14 is connected between the two middles of the two inner surfaces 132 of the two side walls 13 of the assembling portion 1. A width of an upper end of the assembling portion 1 which is disposed between two upper ends of the two outer surfaces 131 of the two side walls 13 is reduced, and a width of a lower end of the assembling portion 1 which is disposed between two lower ends of the two outer surfaces 131 of the two side walls 13 of the assembling portion 1 is reduced by the two inner surfaces 132 of the two side walls 13 of the assembling portion 1 which are the two curve surfaces. The two side walls 13 of the assembling portion 1 are squeezed and deformed by a cooperation of a size of the through hole 200. When the connecting portion 14 is inserted into the through hole 200, the connecting portion 14 is squeezed and deformed. In the first preferred embodiment, the connecting portion 14 has two bending portions 141. The two middles of the two inner surfaces 132 of the two side walls 13 of the assembling portion 1 are bent inward and downward to form the two bending portions 141. Two inner ends of the two bending portions 141 are connected with each other to form the connecting portion 14. Two lower portions of the two bending portions 141 of the connecting portion 14 are connected to form a convex portion 104. A lower surface of the convex portion 104 is shown as a camber shape. The convex portion 104 projects into the lower assembling groove 102. Two upper surfaces of the two bending portions 141 are spaced from each other to form an interval 103. The interval 103 is connected to a middle of a bottom of the upper assembling groove 101.

The inner surface 132 of each side wall 13 has two first curve surfaces 1321 and two second curve surfaces 1322. The upper portion of the upper end and the lower portion of the lower end of the inner surface 132 of each side wall 13 of the assembling portion 1 are curved outward to form two first curve surfaces 1321, respectively. Two inner ends of the two first curve surfaces 1321 are gradually curved inward and towards each other to form two second curve surfaces 1322. The two first curve surfaces 1321 are connected with the upper end and the lower end of each side wall 13, respectively. The width of the upper end of the assembling portion 1 which is disposed between the two upper ends of the two outer surfaces 131 of the two side walls 13 is reduced, and the width of the lower end of the assembling portion 1 which is disposed between the two lower ends of the two outer surfaces 131 of the two side walls 13 of the assembling portion 1 is reduced by the two first curve surfaces 1321 of the two inner surfaces 132 of the two side walls 13 of the assembling portion 1. The two second curve surfaces 1322 of each side wall 13 are connected with an outer end of one bending portion 141 of the connecting portion 14. In the first preferred embodiment, each first curve surface 1321 is a concave surface. Each second curve surface 1322 is a convex surface.

Referring to FIG. 1 to FIG. 5, when the press fit terminal 100 and the through hole 200 are assembled, the press fit terminal 100 is inserted into the through hole 200 of the circuit board, and the press fit terminal 100 is cooperated with the through hole 200 in transition, the two outer surfaces 131 of the two side walls 13 are attached to an interior surface of a ring-shaped inner wall 201 of the through hole 200. The two bending portions 141 are squeezed, and the two bending portions 141 are bent downward to be deformed.

Figure 6:
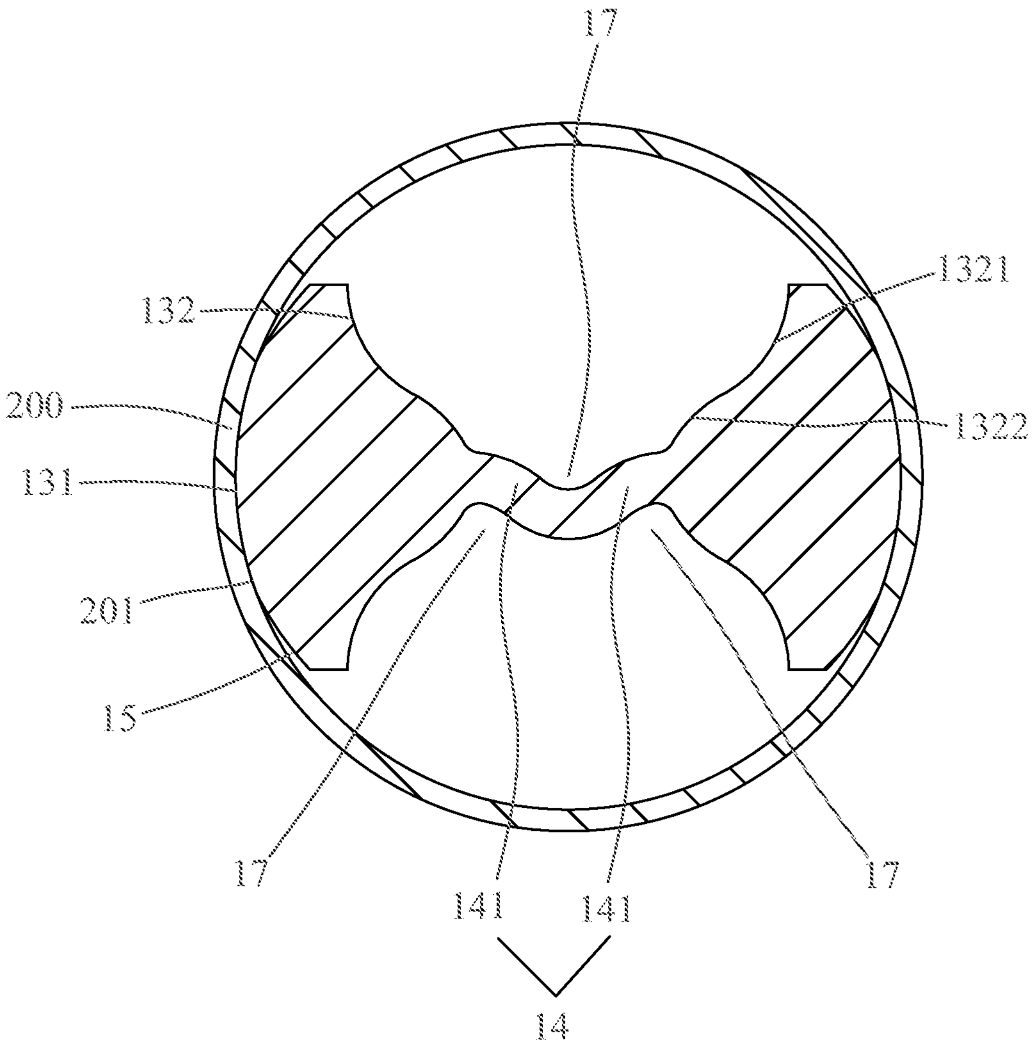
FIG. 6 is another partially sectional diagram of the press fit terminal, wherein when the press fit terminal is inserted into the through hole of the circuit board, the press fit terminal is cooperated with the through hole, and the press fit terminal is spaced a clearance from the through hole.

Referring to FIG. 1 to FIG. 6, when the press fit terminal 100 and the through hole 200 are assembled, the assembling portion 1 of the press fit terminal 100 is inserted into the through hole 200 of the circuit board, the assembling portion 1 of the press fit terminal 100 is cooperated with the through hole 200, and the assembling portion 1 of the press fit terminal 100 is spaced a clearance from the through hole 200, upper ends and lower ends of the two outer surfaces 131 of the two side walls 13 are spaced from the interior surface of the inner wall 201 of the through hole 200, a plurality of gaps 15 are formed among the upper ends and the lower ends of the two outer surfaces 131 of the two side walls 13 of the assembling portion 1 and the interior surface of the inner wall 201 of the through hole 200. The two middle sections 1311 of the two outer surfaces 131 of the two side walls 13 are tightly attached to the interior surface of the inner wall 201 of the through hole 200. The two bending portions 141 are squeezed, and the two bending portions 141 are bent downward to be deformed. When the press fit terminal 100 is cooperated with the through hole 200, and the press fit terminal 100 is spaced the clearance from the through hole 200, a radian of an arc line 17 which is formed between each of the two side walls 13 and one of the two bending portions 141 of the connecting portion 14 is larger. The radian of the arc line 17 which is formed between the second curve surface 1322 of the lower end of each of the two side walls 13 of the assembling portion 1 and a lower surface of the one of the two bending portions 141 of the connecting portion 14 is larger. A radian of another arc line 17 between the two upper surfaces of the two bending portions 141 of the connecting portion 14 is larger. So the press fit terminal 100 has three arc lines 17 with the larger radians.

Figure 7:
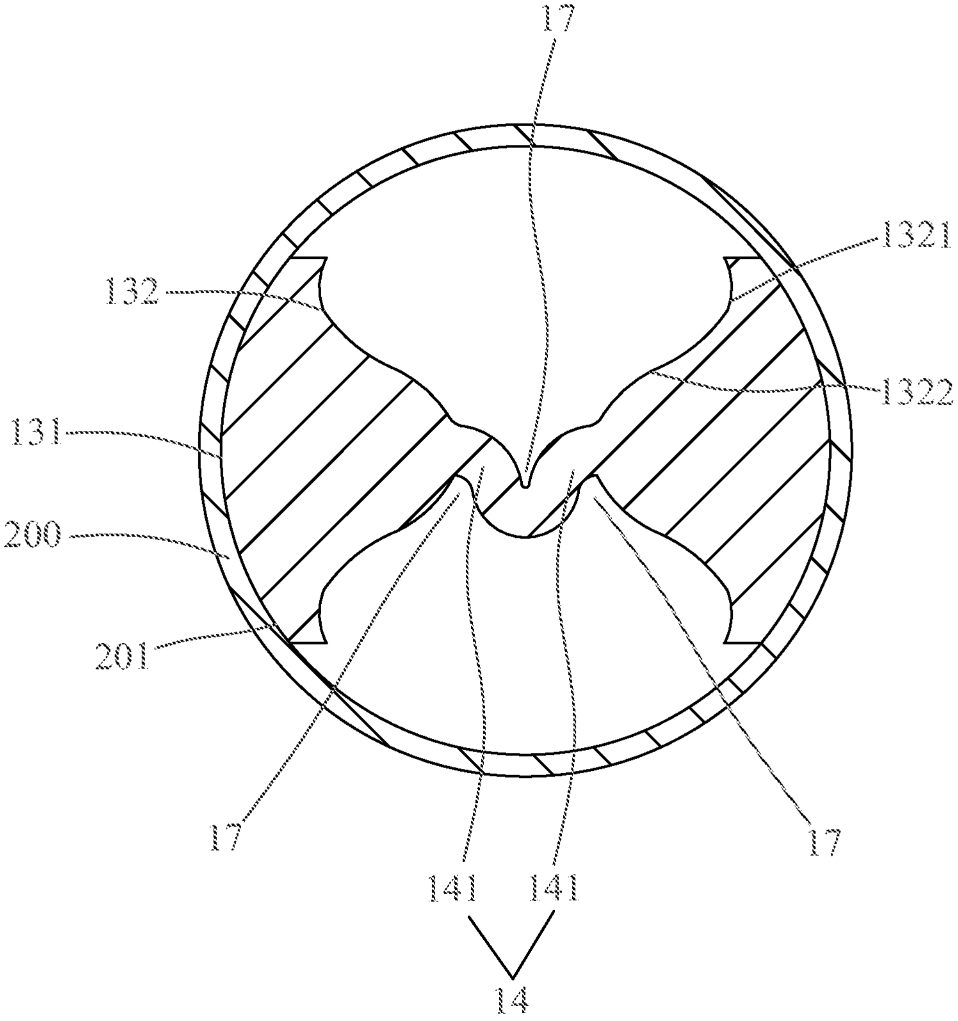
FIG. 7 is one more partially sectional diagram of the press fit terminal, wherein when the press fit terminal is inserted into the through hole of the circuit board, the press fit terminal is cooperated with the through hole of the circuit board, and the press fit terminal is interfered with the through hole of the circuit board.

Referring to FIG. 1 to FIG. 7, when the press fit terminal 100 and the through hole 200 are assembled, the assembling portion 1 of the press fit terminal 100 is inserted into the through hole 200 of the circuit board, the assembling portion 1 of the press fit terminal 100 is cooperated with the through hole 200 of the circuit board, and the assembling portion 1 of the press fit terminal 100 is interfered with the through hole 200 of the circuit board, the two outer surfaces 131 of the two side walls 13 are tightly attached to the interior surface of the inner wall 201 of the through hole 200. The upper ends and the lower ends of the two outer surfaces 131 of the two side walls 13 are squeezed, and the upper ends and the lower ends of the two outer surfaces 131 of the two side walls 13 are deformed. The two inner surfaces 132 of the two side walls 13 are squeezed, and the two inner surfaces 132 of the two side walls 13 are deformed. The two bending portions 141 are squeezed, and the two bending portions 141 are bent downward to be deformed. When the press fit terminal 100 and the through hole 200 are assembled, the press fit terminal 100 is cooperated with the through hole 200 of the circuit board, and the press fit terminal 100 is interfered with the through hole 200 of the circuit board, the radian of the arc line 17 which is formed between each of the two side walls 13 and the one of the two bending portions 141 of the connecting portion 14 becomes smaller. The radian of the arc line 17 which is formed between the second curve surface 1322 of the lower end of each of the two side walls 13 of the assembling portion 1 and the lower surface of the one of the two bending portions 141 of the connecting portion 14 becomes smaller. The radian of the arc line 17 between the two upper surfaces of the two bending portions 141 of the connecting portion 14 becomes smaller.

Figure 8:
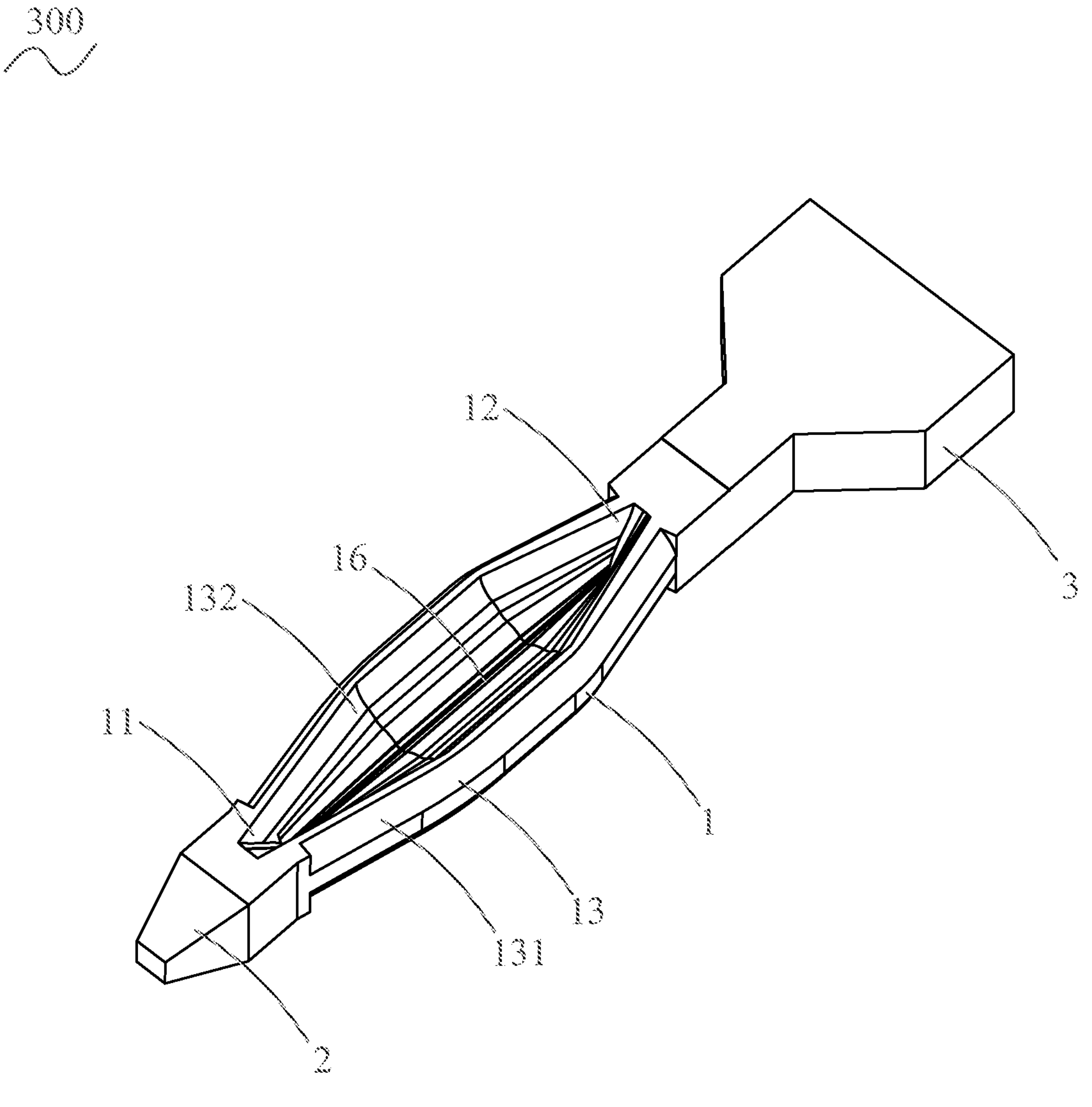
FIG. 8 is a perspective view of a press fit terminal in accordance with a second preferred embodiment of the present invention.
Figure 9:
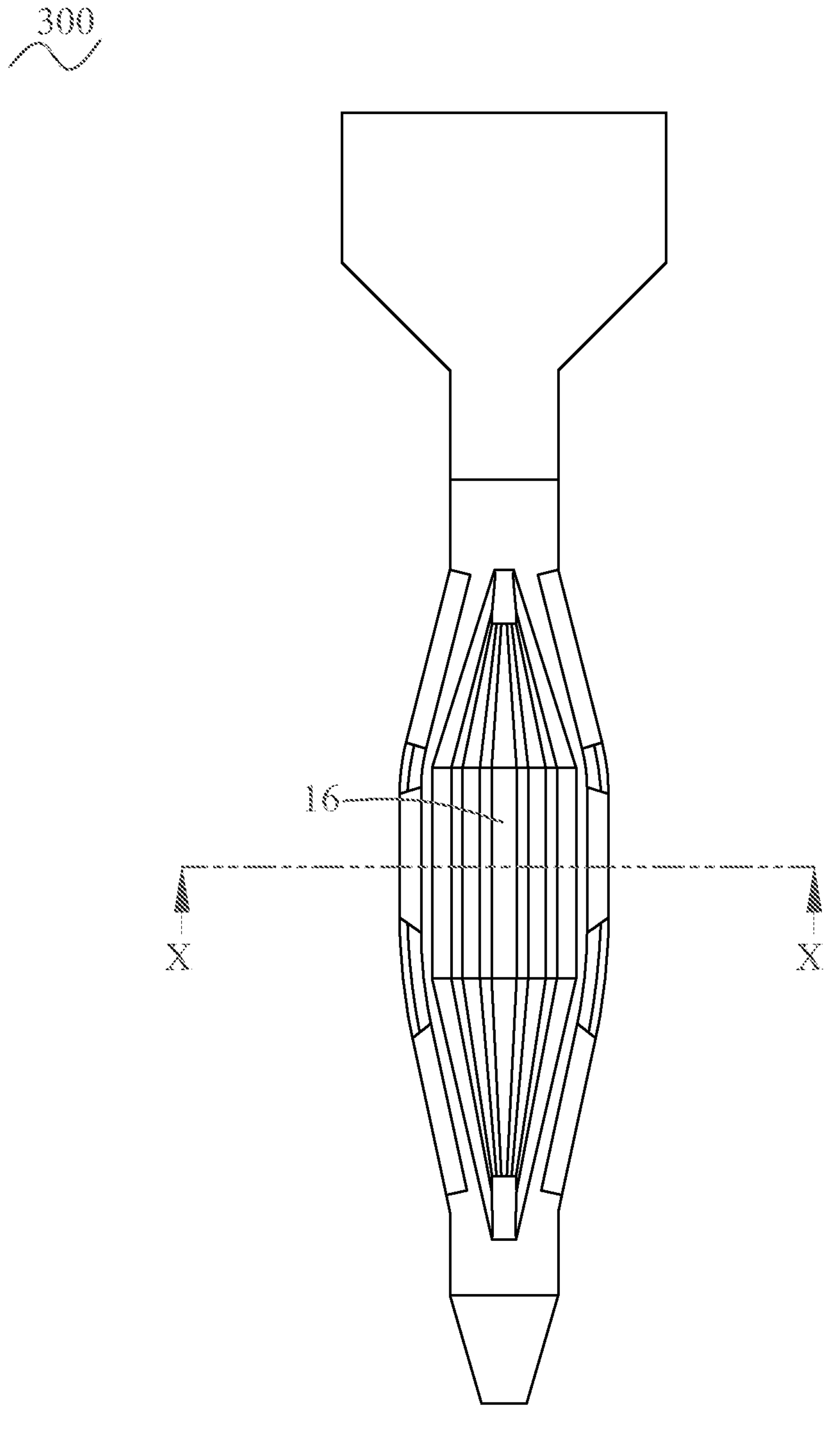
FIG. 9 is a diagrammatic drawing of the press fit terminal in accordance with the second preferred embodiment of the present invention.
Figure 10:
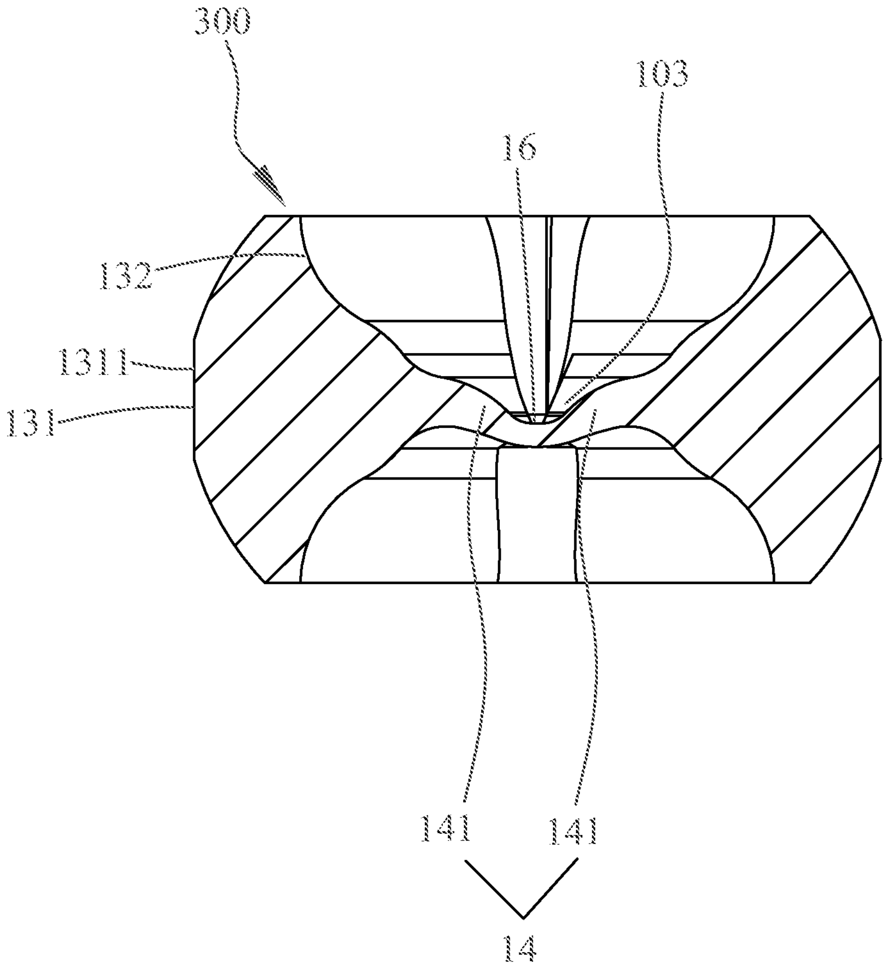
FIG. 10 is a sectional diagram of the press fit terminal along a line IX-IX of FIG. 9.

Referring to FIG. 1 to FIG. 10, a press fit terminal 300 in accordance with a second preferred embodiment of the present invention is shown. Differences between the press fit terminal 100 according to the first preferred embodiment and the press fit terminal 300 according to the second preferred embodiment are described as follows. In the second preferred embodiment, a middle of the upper surface of the connecting portion 14 is recessed downward to form an indentation 16. The indentation 16 is located under the interval 103. The indentation 16 is disposed to a junction between two inner sides of the two bending portions 141. The junction between the two inner sides of the two bending portions 141 is recessed downward to form the indentation 16. The junction between the two inner sides of the two bending portions 141 is disposed at the middle of the connecting portion 14. The indentation 16 is formed at two inner sides of the two bending portions 141. A thickness of a middle of the connecting portion 14 is smaller than two thicknesses of two sides of the connecting portion 14. Thicknesses of the two inner sides of the two bending portions 141 are smaller than thicknesses of two outer sides of the two bending portions 141 by the indentation 16. A thickness of the junction between the two inner sides of the two bending portions 141 is smaller than the thicknesses of the two outer sides of the two bending portions 141 by the indentation 16. The indentation 16 reduces an insertion force of the press fit terminal 300 when the press fit terminal 300 is inserted into the through hole 200.

As described above, the two outer surfaces 131 of the two side walls 13 of the assembling portion 1 are shown as the two arc shapes, and the two inner surfaces 132 of the two side walls 13 of the assembling portion 1 are shown as the two curve surfaces, the two side walls 13 are squeezed and deformed by the cooperation of the size of the through hole 200. The middle of the upper surface of the connecting portion 14 is recessed downward to form the indentation 16, so that the thicknesses of the two inner sides of the two bending portions 141 are smaller than the thicknesses of the two outer sides of the two bending portions 141 by the indentation 16, and the indentation 16 reduces the insertion force of the press fit terminal 300 when the press fit terminal 300 is inserted into the through hole 200. Thus, the press fit terminal 300 is capable of increasing the contact area and reducing the insertion force.

What is claimed is:

1. A press fit terminal inserted into a through hole of a circuit board, comprising:

an assembling portion corresponding to the through hole of the circuit board, the assembling portion having two side walls and a connecting portion, the two side walls being disposed to two opposite sides of the assembling portion, respectively, the connecting portion being disposed in a middle of the assembling portion, the connecting portion being connected between the two side walls, each side wall having an outer surface and an inner surface, the two outer surfaces of the two side walls being shown as two arc shapes, the two inner surfaces of the two side walls being shown as two curve surfaces, the two outer surfaces of the two side walls being tightly attached to an interior surface of an inner wall of the through hole, the inner surface of each side wall having two first curve surfaces and two second curve surfaces, an upper portion of an upper end and a lower portion of a lower end of the inner surface of each side wall being curved outward to form two first curve surfaces, respectively, two inner ends of the two first curve surfaces being gradually curved inward and towards each other to form two second curve surfaces, the connecting portion having two bending portions, the two second curve surfaces of each side wall being connected with an outer end of one bending portion of the connecting portion;

an insertion portion connected with two ends of the two side walls of the assembling portion; and a fastening portion connected with the other two ends of the two side walls of the assembling portion.

2. The press fit terminal as claimed in claim 1, wherein each first curve surface is a concave surface, each second curve surface is a convex surface.

3. The press fit terminal as claimed in claim 1, wherein when the assembling portion is cooperated with the through hole, and the assembling portion is spaced a clearance from the through hole, upper ends and lower ends of the two outer surfaces of the two side walls are spaced from the interior surface of the inner wall of the through hole, a plurality of gaps are formed among the upper ends and the lower ends of the two outer surfaces of the two side walls of the assembling portion and the interior surface of the inner wall of the through hole, two middle sections of the two outer surfaces of the two side walls are tightly attached to the interior surface of the inner wall of the through hole, the two bending portions are bent downward to be deformed, a radian of an arc line which is formed between each of the two side walls and one of the two bending portions of the connecting portion is larger, a radian of another arc line between two upper surfaces of the two bending portions of the connecting portion is larger.

4. The press fit terminal as claimed in claim 3, wherein the radian of the arc line which is formed between the second curve surface of a lower end of each of the two side walls of the assembling portion and a lower surface of the one of the two bending portions of the connecting portion is larger.

5. The press fit terminal as claimed in claim 1, wherein when the assembling portion is cooperated with the through hole, and the assembling portion is interfered with the through hole, the two outer surfaces of the two side walls are tightly attached to the interior surface of the inner wall of the through hole, upper ends and lower ends of the two outer surfaces of the two side walls are squeezed, and the upper ends and the lower ends of the two outer surfaces of the two side walls are deformed, the two inner surfaces of the two side walls are squeezed, and the two inner surfaces of the two side walls are deformed, the two bending portions are bent downward to be deformed, a radian of an arc line which is formed between each of the two side walls and one of the two bending portions of the connecting portion becomes smaller, a radian of an arc line between two upper surfaces of the two bending portions of the connecting portion becomes smaller.

6. The press fit terminal as claimed in claim 5, wherein the radian of the arc line which is formed between the second curve surface of a lower end of each of the two side walls of the assembling portion and a lower surface of the one of the two bending portions of the connecting portion becomes smaller.

7. The press fit terminal as claimed in claim 1, wherein a middle of a top of the assembling portion is recessed inward to form an upper assembling groove, a middle of a bottom of the assembling portion is recessed inward to form a lower assembling groove, the connecting portion is formed between the upper assembling groove and the lower assembling groove, the upper assembling groove is isolated from the lower assembling groove by the connecting portion.

8. The press fit terminal as claimed in claim 7, wherein two upper surfaces of the two bending portions are spaced from each other to form an interval, the interval is connected to a middle of a bottom of the upper assembling groove.

9. The press fit terminal as claimed in claim 7, wherein two lower portions of the two bending portions of the connecting portion are connected to form a convex portion, a lower surface of the convex portion is shown as a camber shape, the convex portion projects into the lower assembling groove.

10. A press fit terminal inserted into a through hole of a circuit board, comprising:

an assembling portion corresponding to the through hole, the assembling portion having two side walls and a connecting portion, the two side walls being disposed to two opposite sides of the assembling portion, respectively, each side wall having an outer surface and an inner surface, the two outer surfaces of the two side walls being shown as two arc shapes, the two inner surfaces of the two side walls being shown as two curve surfaces, the connecting portion being disposed in a middle of the assembling portion, the connecting portion being connected between the two side walls, the connecting portion having two bending portions, a junction between two inner sides of the two bending portions being recessed downward to form an indentation, a thickness of the junction between the two inner sides of the two bending portions being smaller than thicknesses of two outer sides of the two bending portions by the indentation;

an insertion portion connected with two ends of the two side walls of the assembling portion; and a fastening portion connected with the other two ends of the two side walls of the assembling portion.

11. The press fit terminal as claimed in claim 10, wherein when the assembling portion is inserted into the through hole, the assembling portion is cooperated with the through hole, and the assembling portion is interfered with the through hole, the two outer surfaces of the two side walls are tightly attached to an interior surface of an inner wall of the through hole.

12. The press fit terminal as claimed in claim 11, wherein the inner surface of each side wall has two first curve surfaces and two second curve surfaces, an upper portion of an upper end and a lower portion of a lower end of the inner surface of each side wall are curved outward to form two first curve surfaces, respectively, two inner ends of the two first curve surfaces are gradually curved inward and towards each other to form two second curve surfaces, the two second curve surfaces of each side wall are connected with an outer end of one bending portion of the connecting portion.

13. The press fit terminal as claimed in claim 12, wherein each first curve surface is a concave surface, each second curve surface is a convex surface.

14. The press fit terminal as claimed in claim 10, wherein a middle of a top of the assembling portion is recessed inward to form an upper assembling groove, a middle of a bottom of the assembling portion is recessed inward to form a lower assembling groove, the connecting portion is formed between the upper assembling groove and the lower assembling groove, the upper assembling groove is isolated from the lower assembling groove by the connecting portion.

15. The press fit terminal as claimed in claim 14, wherein two upper surfaces of the two bending portions are spaced from each other to form an interval, the interval is connected to a middle of a bottom of the upper assembling groove.

16. The press fit terminal as claimed in claim 15, wherein the indentation is located under the interval.

17. The press fit terminal as claimed in claim 14, wherein two lower portions of the two bending portions of the connecting portion are connected to form a convex portion, a lower surface of the convex portion is shown as a camber shape, the convex portion projects into the lower assembling groove.

18. A press fit terminal inserted into a through hole of a circuit board, comprising:

an assembling portion corresponding to the through hole, the assembling portion having two side walls and a connecting portion, the two side walls being disposed to two opposite sides of the assembling portion, respectively, each side wall having an outer surface and an inner surface, the two outer surfaces of the two side walls being shown as two arc shapes, the two inner surfaces of the two side walls being shown as two curve surfaces, the inner surface of each side wall having two first curve surfaces and two second curve surfaces, an upper portion of an upper end and a lower portion of a lower end of the inner surface of each side wall being curved outward to form two first curve surfaces, respectively, two inner ends of the two first curve surfaces being gradually curved inward and towards each other to form two second curve surfaces, the connecting portion being disposed in a middle of the assembling portion, the connecting portion being connected between the two side walls, the connecting portion having two bending portions, a junction between two inner sides of the two bending portions being recessed downward to form an indentation, a thickness of the junction between the two inner sides of the two bending portions being smaller than thicknesses of two outer sides of the two bending portions by the indentation;

an insertion portion connected with two ends of the two side walls of the assembling portion; and a fastening portion connected with the other two ends of the two side walls of the assembling portion.

19. The press fit terminal as claimed in claim 18, wherein when the assembling portion is inserted into the through hole, the assembling portion is cooperated with the through hole, and the assembling portion is interfered with the through hole, the two outer surfaces of the two side walls are tightly attached to an interior surface of an inner wall of the through hole.

* * * * *